United States Patent
Miyairi et al.

(10) Patent No.: US 9,739,187 B2
(45) Date of Patent: Aug. 22, 2017

(54) WATER RECOVERY DEVICE

(71) Applicant: NGK INSULATORS, LTD., Nagoya (JP)

(72) Inventors: Yukio Miyairi, Nagoya (JP); Shinichi Miwa, Nagoya (JP)

(73) Assignee: NGK Insulators, Ltd., Nagoya (TJ)

( * ) Notice: Subject to any disclaimer, the term of this patent is extended or adjusted under 35 U.S.C. 154(b) by 0 days.

(21) Appl. No.: 15/095,377

(22) Filed: Apr. 11, 2016

(65) Prior Publication Data

US 2016/0333757 A1 Nov. 17, 2016

(30) Foreign Application Priority Data

May 13, 2015 (JP) .................................. 2015-098473

(51) Int. Cl.
*F01N 3/02* (2006.01)
*F02B 47/02* (2006.01)
(Continued)

(52) U.S. Cl.
CPC ......... *F01N 3/0205* (2013.01); *B01D 53/002* (2013.01); *B01D 53/005* (2013.01);
(Continued)

(58) Field of Classification Search
USPC ......... 60/272, 274, 275, 281, 286, 298, 309, 60/320, 324
See application file for complete search history.

(56) References Cited

U.S. PATENT DOCUMENTS 7,007,459 B2 * 3/2006 Lee .................... B01D 53/864
60/278
7,040,088 B2 * 5/2006 Covit ................. B01D 53/9454
60/274
(Continued)

FOREIGN PATENT DOCUMENTS

EP 1 415 779 A1 5/2004
FR 2 926 325 A1 7/2009
(Continued)

OTHER PUBLICATIONS

European Search Report, European Application No. 16166306.7, dated Sep. 27, 2016 (6 pages).
(Continued)

*Primary Examiner* — Binh Q Tran
(74) *Attorney, Agent, or Firm* — Burr & Brown, PLLC

(57) ABSTRACT

A water recovery device includes: an exhaust gas pipe that is connected to a combustion device; a water generation unit that generates water by cooling exhaust gas in the exhaust gas pipe to condense water vapor in the exhaust gas; and a water container that stores water generated by the water generation unit. The water generation unit includes: an acoustic-wave generator that generates acoustic waves by absorbing heat from the exhaust gas pipe and giving the heat to working fluid, which transmits acoustic waves by oscillating, to cause the working fluid to oscillate; a transmission pipe that is internally filled with the working fluid and transmits acoustic waves generated by the acoustic-wave generator; and a cold-heat generator that generates cold heat to supply the cold heat to the exhaust gas pipe by receiving acoustic waves transmitted through the transmission pipe and giving heat to the acoustic waves.

18 Claims, 5 Drawing Sheets

(51) Int. Cl.
*B01D 53/00* (2006.01)
*F02G 5/02* (2006.01)
*F02M 25/022* (2006.01)
*F25B 9/14* (2006.01)

(52) U.S. Cl.
CPC ............... *F02B 47/02* (2013.01); *F02G 5/02* (2013.01); *F02M 25/0222* (2013.01); *F25B 9/145* (2013.01); *F25B 2309/1403* (2013.01)

(56) References Cited

U.S. PATENT DOCUMENTS

| | | |
|---|---|---|
| 2004/0131512 A1 | 7/2004 | Abe et al. |
| 2007/0137851 A1* | 6/2007 | Hamada .................... F01N 5/02 165/274 |
| 2009/0000577 A1* | 1/2009 | Miyagawa ............. F01M 5/001 123/41.2 |
| 2010/0176064 A1* | 7/2010 | Batty ................... B01D 1/0058 210/737 |
| 2016/0146163 A1 | 5/2016 | Takada et al. |

FOREIGN PATENT DOCUMENTS

| | | |
|---|---|---|
| JP | 2005-233485 A | 9/2005 |
| WO | 2014/207916 A1 | 12/2014 |

OTHER PUBLICATIONS

"BMW's water injection system gives turbo engine a boost," Mar. 12, 2015, http://www.foxnews.com/leisure/2015/03/12/bmw-water-injection-system-gives-turbo-engine-boost/.

* cited by examiner

WATER RECOVERY DEVICE

The present application is an application based on JP 2015-098473 filed on May 13, 2015 with the Japan Patent Office, the entire contents of which are incorporated herein by reference.

BACKGROUND OF THE INVENTION

Field of the Invention

The present invention relates to a water recovery device to recover water from exhaust gas including water vapor.

Description of the Related Art

Society as a whole has been recently becoming more and more demanding in reducing of carbon-dioxide, and in response to such a demand, the development of various techniques has been tried in the technical fields to produce power by combusting fuel (e.g., for engines of automobiles) so as to improve thermal efficiency (power) of a power engine.

One of the contemplated methods to improve the thermal efficiency of a gasoline engine is to increase the compression ratio during compression of mixture gas of evaporated gasoline and air. Actually according to this method, a larger explosion power (expansion power) can be obtained when this compressed mixture gas is ignited, meaning that a larger power can be produced from the same amount of fuel.

It is known in general, however, that when the compression ratio is high, abnormal combustion likely occurs, in which impurities in the gasoline engine, such as carbon, trigger ignition prior to the ignition by an ignition device.

As one measure to avoid such a problem, a method is proposed to inject water beforehand to add water to the mixture gas of evaporated gasoline and air (see Non Patent Document 1, for example). In this method, the added water can control abnormal combustion because it suppresses drying in the gasoline engine. Water to be injected for addition is stored in a container, such as a tank, and is used little by little along with the operation of the gasoline engine, and when the amount of water in the container becomes low, water is fed from the outside in the same way as gasoline as fuel.

NON PATENT DOCUMENT 1

URL: http://www.foxnews.com/leisure/2015/03/12/bmw-water-injection-system-gives-turbo-engine-boost/ on the Internet

SUMMARY OF THE INVENTION

Along with a recent increase in the awareness of environmental issues, including carbon-dioxide reduction as stated above, there is an increased demand for effective use of water resource, and so the development of various techniques to reuse water resource is strongly demanded.

In the method of Non-Patent Document 1 as stated above, when the amount of water becomes low, it will be fed from the outside. Herein exhaust gas from a gasoline engine originally includes a large amount of water vapor. Then such a way of disposing of a large amount of water vapor while separately feeding water newly from the outside is wasteful of water resource, which is against the demand to effectively use water resource.

Therefore it is strongly desired that, when the technique of Non-Patent Document 1 is used, water recovered from exhaust gas be used as water to suppress abnormal combustion of a gasoline engine.

The above describes the specific use of recovered water, by way of an example to suppress abnormal combustion in a gasoline engine. Since water can be used originally for various purposes, the recovery of water from exhaust gas itself is effective from the viewpoint of effective use of water resource, and such effectiveness is not limited to the case of the specific use as stated above. That is, recovery of water from exhaust gas will be effective not only for a gasoline engine but also for a whole of general combustion devices to combust fuel and emit exhaust gas including water vapor.

Actually, there are some regions in the world where it is difficult to get water resource which is precious in such regions although it is relatively easy to get fuels such as oil. In such regions, effective use of water resource is highly required and a technique enabling recovery of water from exhaust gas of various combustion devices will be especially effective there.

In view of these circumstances, the present invention aims to provide a water recovery device to recover water from exhaust gas including water vapor for effective use of water resource.

To fulfill the above-mentioned object, the present invention provides the following heat/acoustic wave conversion component and heat/acoustic wave conversion unit.

[1] A water recovery device to recover water from exhaust gas including water vapor, including: an exhaust gas pipe that is connected to a combustion device which combusts fuel to emit exhaust gas including water vapor, and that defines an exhaust path of exhaust gas emitted from the combustion device; a water generation unit that generates water by cooling exhaust gas in the exhaust gas pipe to condense water vapor in the exhaust gas; a water container that is disposed on the exhaust path and stores water generated by the water generation unit, wherein the water generation unit includes: an acoustic-wave generator that generates acoustic waves by absorbing heat from the exhaust gas pipe and giving the heat to working fluid, which transmits acoustic waves by oscillating, to cause the working fluid to oscillate; a transmission pipe that is internally filled with the working fluid and transmits acoustic waves generated by the acoustic-wave generator via oscillations of the working fluid; and a cold-heat generator that generates cold heat to supply the cold heat to the exhaust gas pipe by receiving acoustic waves transmitted through the transmission pipe and giving heat to the acoustic waves.

[2] The water recovery device according to [1], wherein the acoustic-wave generator includes: a first heat/acoustic wave conversion component that has a wall part defining a through hole which penetrates through two ends of the first heat/acoustic wave conversion component and which is internally filled with the working fluid, the first heat/acoustic wave conversion component mutually converting heat exchanged between the wall part and the working fluid and acoustic-wave energy resulting from oscillations of the working fluid; and a first heat exchanger that comes into contact with the exhaust gas pipe, and that is disposed close to one end face of the two end faces of the first heat/acoustic wave conversion component, the first heat exchanger transmitting heat from the exhaust gas pipe to the one end face so as to keep temperature at the one end face relatively higher than temperature at the other end face, wherein the transmission pipe has one end thereof directly or indirectly connected to the other end face of the first heat/acoustic wave conversion component, and transmits acoustic waves coming out from the other end face toward the other end of the transmission pipe, and wherein the cold-heat generator includes: a second heat/acoustic wave conversion component that has a wall part defining a through hole which penetrates through two ends of the second heat/acoustic wave conversion component, which is internally filled with the working fluid, and through which acoustic waves transmitted through the transmission pipe travel, the second heat/acoustic wave conversion component mutually converting heat exchanged between the wall part and the working fluid and acoustic-wave energy from oscillations of the working fluid; and a second heat exchanger that comes into contact with the exhaust gas pipe, that is disposed close to an end face located upstream in a traveling direction of acoustic waves in the through hole, of the two end faces of the second heat/acoustic wave conversion component, and that is connected to the other end of the transmission pipe, the second heat exchanger giving heat to acoustic waves transmitted through the transmission pipe so as to keep temperature at the end face located upstream in the traveling direction relatively lower than temperature at an end face located downstream in the traveling direction, of the two end faces of the second heat/acoustic wave conversion component.

[3] The water recovery device according to [2], wherein the acoustic-wave generator further includes a third heat exchanger that is disposed close to the other end face of the two end faces of the first heat/acoustic wave conversion component and that exchanges heat with surrounding air so as to keep temperature at the other end face substantially at air temperature, and the cold-heat generator further includes a fourth heat exchanger that is disposed close to the end face located downstream in the traveling direction of the two end faces of the second heat/acoustic wave conversion component and that exchanges heat with surrounding air so as to keep temperature at the end face located downstream in the traveling direction substantially at air temperature.

[4] The water recovery device according to [2] or [3], wherein
each of the first heat/acoustic wave conversion component and the second heat/acoustic wave conversion component is a honeycomb structure having a partition wall as the wall part that defines a plurality of cells extending between the two end faces, hydraulic diameter HD of the honeycomb structure is 0.4 mm or less, where the hydraulic diameter HD is defined as HD=4×S/C, where S denotes an area of a cross section of each cell perpendicular to the cell penetrating direction and C denotes a perimeter of the cross section, and the honeycomb structure has an open frontal area at each end face of 60% or more and 93% or less.

[5] The water recovery device according to [4], wherein at least one of the first heat/acoustic wave conversion component and the second heat/acoustic wave conversion component is a honeycomb structure made of cordierite.

[6] The water recovery device according to any one of [1] to [5], wherein the combustion device is an engine that generates power by evaporating fuel and combusting the evaporated fuel, and has a water addition mechanism which adds water to the evaporated fuel by injecting water, and the water recovery device further includes a water supply mechanism that supplies water stored in the water container to the water addition mechanism.

[7] The water recovery device according to [6], wherein the exhaust gas pipe is a bypass exhaust pipe that defines an exhaust path for 1 to 50 volume % of exhaust gas of the entire exhaust gas emitted from the combustion device.

[8] The water recovery device according to any one of [1] to [7], further comprising a heat dissipation member that is disposed on the exhaust gas pipe, and protrudes toward an outside of the exhaust gas pipe to let heat of the exhaust gas pipe out of the exhaust gas pipe.

According to the water recovery device of the present invention, acoustic waves are generated from heat of an exhaust gas pipe, cold heat is generated from the acoustic waves, and water vapor in the exhaust gas is condensed due to the cold heat so as to recover water. In this way, the water recovery device of the present invention enables recovery of water by generating the water from exhaust gas based on a so-called thermoacoustic effect, thus achieving effective use of water resource.

DESCRIPTION OF THE PREFERRED EMBODIMENTS

The following describes embodiments of the present invention, with reference to the drawings. The present invention is not limited to the following embodiments, and is to be understood to include the following embodiments, to which modifications and improvements are added as needed based on the ordinary knowledge of a person skilled in the art without departing from the scope of the present invention.

Figure 1:
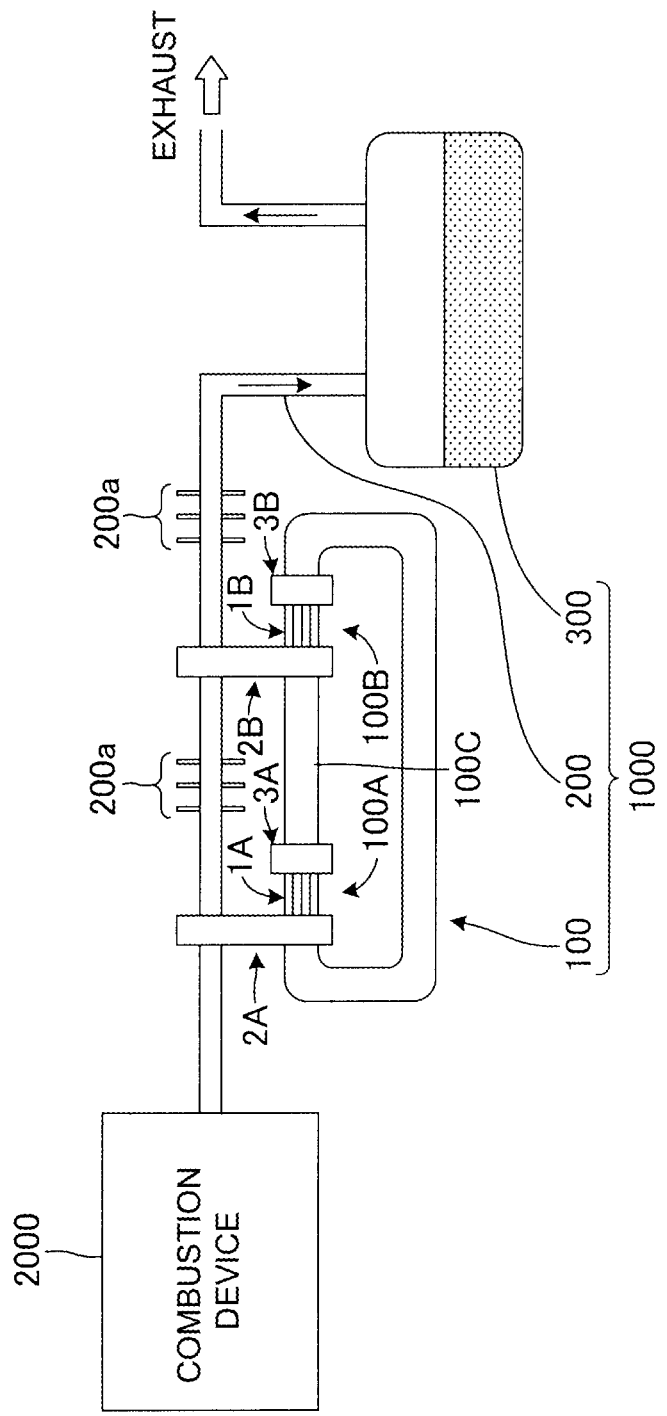
FIG. 1 is a schematic conceptual view showing the configuration of a water recovery system to which one embodiment of a water recovery device of the present invention is applied.

FIG. 1 is a schematic conceptual view showing the configuration of a water recovery system to which one embodiment of a water recovery device of the present invention is applied.

The water recovery system shown in FIG. 1 includes a combustion device 2000 and a water recovery device 1000.

The combustion device 2000 is a device to combust fuel and emit exhaust gas including water vapor. Examples of the combustion device 2000 include a power engine to combust fuel and generate power (typically an engine), an electric-power generator to combust fuel and generate electric power, and a heater to combust fuel and generate hot air (hot wind) for a heater. Examples of the fuel include oil, coal and natural gas as well as a fuel made of their purified products or processed products. Such a fuel, when it is combusted, combines with oxygen in the air to generate water in the form of water vapor, and so exhaust gas including the water vapor will be emitted.

The following describes the water recovery device 1000. The water recovery device 1000 includes a water generation unit 100, an exhaust gas pipe 200 and a water container 300.

The exhaust gas pipe 200 is connected to the combustion device 2000, and defines an exhaust path of exhaust gas emitted from the combustion device 2000. A heat dissipation member 200a is preferably provided on the exhaust gas pipe 200, having a shape protruding toward the outside of the exhaust gas pipe 200, to let heat of the exhaust gas pipe 200 out.

The water generation unit 100 generates water by cooling exhaust gas in the exhaust gas pipe 200 to condense water vapor in the exhaust gas. The configuration of the water generation unit 100 to generate water is described later.

The water container 300 is provided along the exhaust path of the exhaust gas as stated above, and water generated in the water generation unit 100 drips into the water container 300 and is stored in the water container 300. Exhaust gas subjected to the condensing processing of water by the water generation unit 100 passes through the water container 300, and is finally emitted to the outside. In FIG. 1, the path of exhaust gas passing through the water container 300 is indicated with the downward solid arrow in the drawing toward the water container 300 and with the upward solid arrow in the drawing from the water container 300, and the exhaust gas emitted to the outside is indicated with the thick arrow to the right in the drawing.

The following describes the configuration of the water generation unit 100.

The water generation unit 100 includes an acoustic-wave generator 100A, a cold-heat generator 100B and a transmission pipe 100C.

The acoustic-wave generator 100A generates acoustic waves by absorbing heat from the exhaust gas pipe 200 and converting the heat into acoustic-wave energy by means of a so-called thermoacoustic effect. This conversion into acoustic-wave energy is implemented by giving the absorbed heat to working fluid, which transmits acoustic waves by oscillating, to cause the working fluid to oscillate. Examples of the working fluid include gas having low viscosity and being less reactive, such as rare gas.

The acoustic-wave generator 100A includes, as the configuration to implement conversion into acoustic-wave energy, a first heat/acoustic wave conversion component 1A and two heat exchangers 2A and 3A. The first heat/acoustic wave conversion component 1A includes thin tubular through holes (e.g., a plurality of cells described later) formed so as to penetrate through two end faces of the first heat/acoustic wave conversion component 1A, and these through holes are internally filled with the working fluid as stated above and are in communication with the transmission pipe 100C described later. The two heat exchangers 2A and 3A are provided having the first heat/acoustic wave conversion component 1A disposed therebetween so as to be close to both of the end faces of the first heat/acoustic wave conversion component 1A, respectively. Herein, the heat exchanger 2A that is one of the two heat exchangers 2A and 3A is in contact with the exhaust gas pipe 200, and the other heat exchanger 3A is separated from the exhaust gas pipe 200. The other heat exchanger 3A exchanges heat with the air so as to keep the temperature of the end face of the first heat/acoustic wave conversion component 1A close to the other heat exchanger 3A to a substantially constant low temperature in the range of 0 to 65° C. in accordance with the air temperature. The one heat exchanger 2A as stated above transmits heat from the exhaust gas pipe 200 to the end face of the first heat/acoustic wave conversion component 1A close to the one heat exchanger 2A so as to keep this end face at a temperature relatively higher than that at the other end face (the end face on the other side close to the other heat exchanger 3A as stated above).

Since there is a temperature difference as stated above at the both ends of the first heat/acoustic wave conversion component 1A, the working fluid in the thin tubular through holes of the first heat/acoustic wave conversion component 1A starts to oscillate in the penetrating direction of these through holes, and the oscillations are transmitted as acoustic waves externally from the heat/acoustic wave conversion component 1. Such a phenomenon of the working fluid oscillating in response to the given temperature difference is called self-induced oscillations, and is a conventionally well-known phenomenon that occurs when a temperature gradient is given to a thin tube. A thermoacoustic effect refers to such generation of acoustic waves due to the self-induced oscillation of working fluid resulting from heat. The following briefly describes this self-induced oscillation (a lot of documents describe the details, and JP 2012-237295 also provides the detailed descriptions thereon, for example).

When giving a temperature gradient to a thin tube, working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillations of the working fluid in the extending direction of the tube. Simply speaking, such motion of the working fluid can be said a motion to convey heat so as to alleviate (weaken) the temperature gradient at the wall surface. As can be clear from this description as well, such a phenomenon occurs only when the tube is so thin that the thermal effects on the working fluid inside from the wall surface are large. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as $HD=4 \times S/C$, where S denotes the cross-sectional area of the tube and C denotes the perimeter of this section.

The thin tubular through holes in the first heat/acoustic wave conversion component 1A as stated above have an enough small hydraulic diameter HD to generate self-induced oscillation, and therefore self-induced oscillation occurs due to the temperature difference as stated above at the both end faces of the first heat/acoustic wave conversion component 1A. This self-induced oscillation generates acoustic waves that travel from the end face close to the heat exchanger 2A on the high-temperature side to the end face close to the heat exchanger 3A on the low-temperature side. The heat exchanger 3A is connected to the transmission pipe 100C described later, and the generated acoustic waves travel through this transmission pipe 100C toward a heat exchanger 2B of the cold-heat generator 100B described later.

Returning to the description on the configuration of the water generation unit 100, the following describes the transmission pipe 100C and the cold-heat generator 100B that are the elements of the water generation unit 100 other than the acoustic-wave generator 100A.

The transmission pipe 100C is internally filled with the above-mentioned working fluid, and transmits acoustic waves generated by the acoustic-wave generator 100A via oscillations of this working fluid.

Receiving acoustic waves transmitted through the transmission pipe 100C, the cold-heat generator 100B generates cold heat by means of opposite mechanism (temperature gradient occurs at the through holes due to acoustic waves) of the thermoacoustic effect (acoustic waves are generated due to a temperature gradient of the through holes) as stated above, and supplies the cold heat to the exhaust gas pipe 200. In other words, the cold-heat generator 100B gives heat to the acoustic waves transmitted through the transmission pipe 100C so as to generate a temperature gradient, thereby creating a low-temperature state at a specific part, and supplying cold heat due to such a low-temperature state to the exhaust gas pipe 200.

As the configuration to generate cold heat, the cold-heat generator 100B includes a second heat/acoustic wave conversion component 1B and two heat exchangers 2B and 3B. As is evident from that this is based on the opposite mechanism of the thermoacoustic effect as stated above, similar configuration to that of the first heat/acoustic wave conversion component 1A and the two heat exchangers 2A and 3A in the acoustic-wave generator 100A as stated above can be used for the second heat/acoustic wave conversion component 1B and the two heat exchangers 2B and 3B.

That is, the second heat/acoustic wave conversion component 1B includes thin tubular through holes (e.g., a plurality of cells described later) formed so as to penetrate through two end faces of the second heat/acoustic wave conversion component 1B, and these through holes are internally filled with the working fluid as stated above and are in communication with the transmission pipe 100C described later. Acoustic waves transmitted through the transmission pipe 100C travel through these through holes. The heat exchanger 2B that is one of the two heat exchangers 2B and 3B is close to the end face of the second heat/acoustic wave conversion component 1B located upstream in the traveling direction of acoustic waves in these through holes, and is in contact with the exhaust gas pipe 200. The other heat exchanger 3B is close to the end face of the second heat/acoustic wave conversion component 1B located downstream in the traveling direction of acoustic waves, and exchanges heat with the air so as to keep the temperature of this downstream end face to a substantially constant low temperature in the range of 0 to 65° C. in accordance with the air temperature. The one heat exchanger 2B as stated above is connected to the transmission pipe 100C, receives acoustic waves transmitted through the transmission pipe 100C and gives heat to the acoustic waves so that the temperature gradient corresponding to these acoustic waves is formed in the through holes. As a result, the one heat exchanger 2B and the end face of the second heat/acoustic wave conversion component 1B close to the one heat exchanger 2B (upstream end face in the traveling direction of acoustic waves) have a relatively lower temperature than that of the other end face (downstream end face in the traveling direction of acoustic waves). The exhaust gas pipe 200 is cooled because the exhaust gas pipe 200 comes into contact with the one heat exchanger 2B in a low-temperature state. In other words, cold heat is supplied from the one heat exchanger 2B to the exhaust gas pipe 200.

Hereinafter for clear distinguishing among the four heat exchangers 2A, 2B, 3A and 3B, the heat exchanger 2A of the acoustic-wave generator 100A and the heat exchanger 2B of the cold-heat generator 100B, which are the heat exchangers coming into contact with the exhaust gas pipe 200, are called the first heat exchanger 2A and the second heat exchanger 2B, respectively. The heat exchanger 3A of the acoustic-wave generator 100A and the heat exchanger 3B of the cold-heat generator 100B, which are the heat exchangers not coming into contact with the exhaust gas pipe 200, are called the third heat exchanger 3A and the fourth heat exchanger 3B, respectively. Note here that, although the second heat exchanger 2B has a function different from that of the first heat exchanger 2A, it can have the same configuration as that of the first heat exchanger 2A as stated above. The fourth heat exchanger 3B also can have the same configuration as that of the third heat exchanger 3A as stated above.

As described above, the transmission pipe 100C is connected to both of the third heat exchanger 3A of the acoustic-wave generator 100A and the second heat exchanger 2B of the cold-heat generator 100B, and has a function to transmit acoustic waves generated at the acoustic-wave generator 100A to the cold-heat generator 100B. Herein as shown in FIG. 1, the transmission pipe 100C is connected to both of the fourth heat exchanger 3B of the cold-heat generator 100B and the first heat exchanger 2A of the acoustic-wave generator 100A as well, and as a result, a loop-like transmission path of acoustic waves is defined as a whole in the water generation unit 100 in FIG. 1. The working fluid is confined in this loop-like transmission pipe 100C, and has a function to transmit acoustic waves, and the acoustic waves mainly travel through this loop-like transmission path counterclockwise in FIG. 1. Although in the following, the description is continued based on this loop-like transmission pipe 100C, the present invention may include any path through which acoustic waves generated at the acoustic-wave generator 100A can be transmitted to the cold-heat generator 100B as the minimum requirement. That is, the present invention may include various forms of the transmission pipe that meet the minimum requirement as stated above and are well-known in the field of thermoacoustic effects, other than the loop-like form as in the transmission pipe 100C of FIG. 1. These various forms that can be used are described later.

That is the description on the configuration of the water generation unit 100 in FIG. 1.

The water recovery device 1000 enables effective recovery of water from exhaust gas in the exhaust gas pipe 200 by cooling the exhaust gas pipe 200 with the water generation unit 100 that makes use of the thermoacoustic effect in this way. Accordingly, water, which would be disposed to the air without the water generation unit 100, can be used as another purpose, by which water resource can be used effectively. Water can be used for various purposes. For instance, water can be used to cool, wash or humidify some devices or components (a specific example of the humidifying is described later).

Further cooling by the water generation unit 100 is performed using heat of the exhaust gas pipe 200, which would be disposed without the water generation unit 100, and no energy is supplied from the outside other than this heat (e.g., circulation of cooling water separately performed is not required), and therefore effective use of energy resource also can be achieved at the same time.

The following describes one specific example of the configuration of the acoustic-wave generator 100A in FIG. 1.

Figure 2:
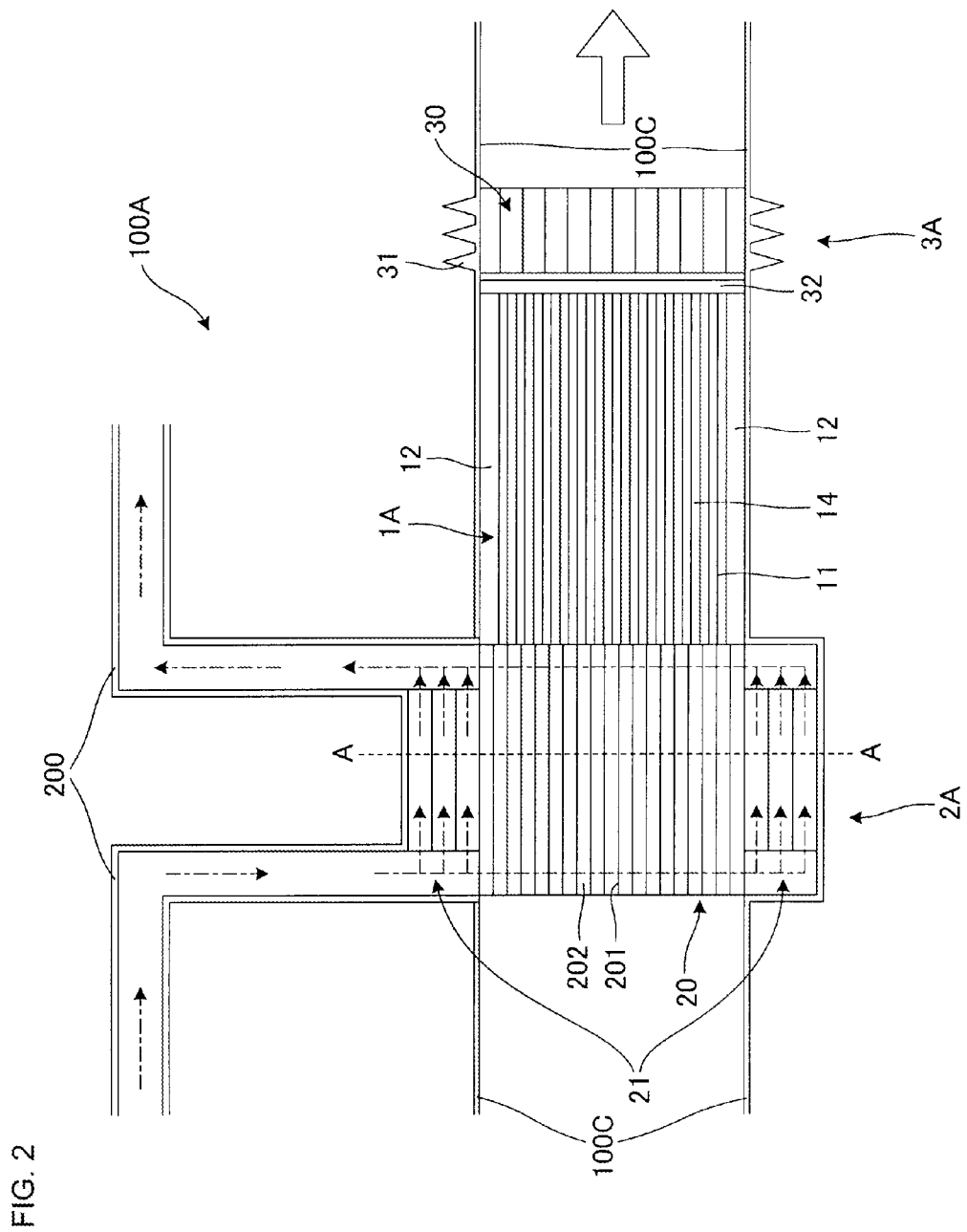
FIG. 2 is a schematic view showing one specific example of the configuration of the acoustic-wave generator in FIG. 1.

FIG. 2 is a schematic view showing one specific example of the configuration of the acoustic-wave generator 100A in FIG. 1.

The following describes one specific example of the configuration of the acoustic-wave generator 100A in FIG. 1, in which the sane reference numerals are used for elements corresponding to the elements of FIG. 1. As described above, since the cold-heat generator 100B of FIG. 1 can have the same configuration as that of the acoustic-wave generator 100A, the following specific example of the configuration of the acoustic-wave generator 100A corresponds to a specific example of the configuration of the cold-heat generator 100B as well.

As described above referring to FIG. 1, the acoustic-wave generator 100A of FIG. 2 includes the first heat/acoustic wave conversion component 1A, the first heat exchanger 2A and the third heat exchanger 3A, and additionally includes a metal member 32 and an interference member 12 as well.

The heat/acoustic wave conversion component 1A of FIG. 2 has a honeycomb structure in which a plurality of cells 14, each being a thin-tube like through hole, are defined by a partition wall 11. Herein, the word "cells" in the present specification refers to a through hole only that does not include the partition wall. Each cell 14 has a penetrating direction (an extending direction in which each cell 14 extends) that is the horizontal direction (lateral direction) of FIG. 2, and is open at both end faces of an end face on the third heat exchanger 3A side and an end face of the first heat exchanger 2A side. The end face of the heat/acoustic wave conversion component 1 on the third heat exchanger 3A side is in contact with the metal member 32, and is opposed to the third heat exchanger 3A with the metal member 32 disposed therebetween. Note here that, since the metal member 32 plays a role for heat conduction as described later, the metal member 32 is preferably made of a material having large heat conductivity, which may be made of e.g., copper. The present invention may have a form of omitting the metal member 32, and in this case, a gap between the heat/acoustic wave conversion component 1 and the third heat exchanger 3A is as small as possible preferably.

The metal member 32 is a member made of metal having a plate shape, at a center part of which a plurality of parallel slits (not illustrated) are formed, and FIG. 2 illustrates a side-face part (thickness part) of the plate shape only.

The third heat exchanger 3A of FIG. 2 includes a mesh lamination body 30 formed by the lamination of a plurality of metal mesh plates (e.g., made of copper). The mesh lamination body 30 has a side face, at which a fin 31 is provided so as to protrude externally of the mesh lamination body 30. The fin 31 has a function of mediating heat exchange between the mesh lamination body 30 and the air so as to keep the temperature of the mesh lamination body 30 at a substantially constant low temperature in the range of 0 to 65° C. in accordance with the air temperature. For instance, the fin 31 releases heat of the mesh lamination body 30 to the air, which can prevent the mesh lamination body 30 from reaching a high temperature. The temperature of the mesh lamination body 30 can be kept at such a low temperature, whereby the end face of the heat/acoustic wave conversion component 1 on the third heat exchanger 3A side close to the mesh lamination body 30 via the metal member 32 also can be kept at such a low temperature.

The side face of the heat/acoustic wave conversion component 1 of FIG. 2 is surrounded by the interference member 12, and FIG. 2 schematically shows the cross section of the surrounding interference member 12 as two parts of the interference member 12 that sandwich the heat/acoustic wave conversion component 1 from both of upper and lower sides in the drawing. This interference member 12 has a function as a thermal insulator to avoid heat transmission via the surrounding environment outside of the heat/acoustic wave conversion component 1 between the end on the third heat exchanger 3A side of the heat/acoustic wave conversion component 1 and the end on the first heat exchanger 2A side of the heat/acoustic wave conversion component 1.

The first heat exchanger 2A of FIG. 2 includes a honeycomb structure 20 for working fluid and a honeycomb structure 21 for exhaust gas.

The honeycomb structure 20 for working fluid is a pillar-shaped honeycomb structure made of a metal material, and in the honeycomb structure 20 for working fluid, two or more cells 202, each extending in the horizontal direction (lateral direction) of FIG. 2, are defined by a partition wall 201. These two or more cells 202 are in communication with the transmission pipe 100C and the plurality of cells 14 of the first heat/acoustic wave conversion component 1A, and are filled with working fluid. Herein unlike the first heat/acoustic wave conversion component 1A, each of these two or more cells 202 has a sufficiently large hydraulic diameter, so that self-induced oscillations can be substantially ignored in the honeycomb structure 20 for working fluid. As shown in FIG. 2, the honeycomb structure 20 for working fluid is close to the end face of the first heat/acoustic wave conversion component 1A (end face on the first heat exchanger 2A side), and has a function of receiving heat from the honeycomb structure 21 for exhaust gas described below and transmitting the heat to this end face (the end face on the first heat exchanger 2A side) to keep it at a high temperature (the state having a temperature higher than the temperature at the end face on the third heat exchanger 3A side).

From the aspect of such a function of heat conduction, the metal honeycomb structure 20 for working fluid is preferably made of a material having large heat conductivity, which may be copper, for example. Alternatively, instead of such a member having a honeycomb structure, a member having the configuration of a mesh lamination body formed by the lamination of a plurality of metal (e.g., copper) mesh plates may be used. Herein, from the aspect of preventing such a metal honeycomb structure 20 for working fluid (or mesh lamination body) from altering in quality due to reaction with working fluid under high temperature, the working fluid used preferably is less reactive with metals, such as rare gas. When the working fluid that is less reactive with metals is not used, e.g., when air is used as it is as the working fluid, a honeycomb structure made of a ceramic material containing SiC (silicon carbide), which is not metal but has relatively large heat conductivity, as a main component may be used, instead of the honeycomb structure 20 for working fluid made of metal.

By being connected to the transmission pipe 100C, the honeycomb structure 20 for working fluid also has a function as a traveling path of acoustic waves, in addition to heat conduction as stated above. That is, if some acoustic waves of the acoustic waves generated at the acoustic-wave generator 100A and traveling along the transmission pipe 100C in the direction of the thick arrow of FIG. 2 successively pass through the cold-heat generator 100B of FIG. 1, such acoustic waves will reach the acoustic-wave generator 100A again after passing through the cold-heat generator 100B, which means that they will travel through two or more cells 202 in the honeycomb structure 20 for working fluid.

Next the following describes the honeycomb structure 21 for exhaust gas that is another element of the first heat exchanger 2A other than the honeycomb structure 20 for working fluid.

The honeycomb structure 21 for exhaust gas is a hollow and round pillar-shaped (in other words, a cylindrical shape having a thickness in the radial direction) surrounding the honeycomb structure 20 for working fluid, and is made of a ceramic material containing SiC (silicon carbide) as a main component. In FIG. 2, the honeycomb structure 21 for exhaust gas surrounding the honeycomb structure 20 for working fluid is shown as separate parts above and below the honeycomb structure 20 for working fluid. Actually, although a metal outer tube 23 and a metalized layer 22, which are described later referring to FIG. 3, are present between the honeycomb structure 20 for working fluid and the honeycomb structure 21 for exhaust gas, FIG. 2 omits them.

Figure 3:
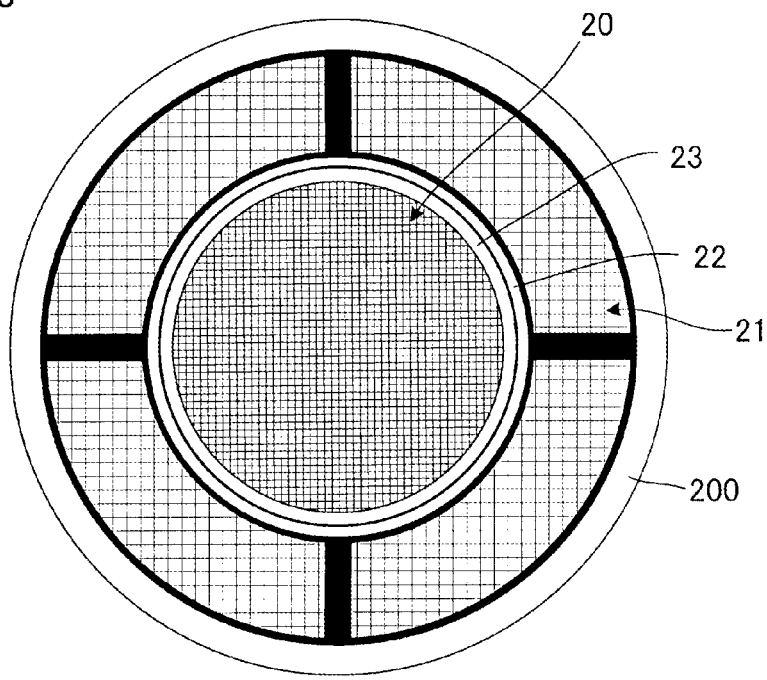
FIG. 3 is a cross-sectional view of the first heat exchanger taken along the line A-A of FIG. 2.

FIG. 3 is a cross-sectional view of the first heat exchanger 2A taken along the line A-A of FIG. 2.

As shown in FIG. 3, the honeycomb structure 21 for exhaust gas surrounds the honeycomb structure 20 for working fluid via the tube-like metalized layer 22 and the metal outer tube 23. Herein, the metal outer tube 23 is a tube-like metal member, into which the honeycomb structure 20 for working fluid is fitted, and has a function to hold the honeycomb structure 20 for working fluid from the circumference. When the honeycomb structure 20 for working fluid itself has a metal circumferential wall surrounding its circumferential face, the metal outer tube 23 may be omitted. The metalized layer 22 is a layer formed by baking of metal, such as molybdenum and manganese, which is a layer to bond the metal outer tube 23 made of metal (when the metal outer tube 23 is omitted, the metal circumferential wall of the honeycomb structure 20 for working fluid) and the honeycomb structure 21 for exhaust gas made of ceramic.

Referring back to FIG. 2, the descriptions on the honeycomb structure 21 for exhaust gas are continued in the following.

Similarly to the honeycomb structure 20 for working fluid, the honeycomb structure 21 for exhaust has a configuration, including two or more cells extending in the horizontal direction (lateral direction) of FIG. 2 that are defined by a partition wall. The honeycomb structure 21 for exhaust gas is connected to the exhaust gas pipe 200, and exhaust gas flows into the honeycomb structure 21 for exhaust gas to give heat thereto and flows out from the honeycomb structure 21 for exhaust gas. In FIG. 2, the traveling path of exhaust gas is indicated with the dashed-dotted arrows, and as shown in this drawing, each cell of the honeycomb structure 21 for exhaust gas serves as the traveling path of exhaust gas flowing from the exhaust gas pipe 200. Heat transmitted from the exhaust gas to the honeycomb structure 21 for exhaust gas is transmitted to the circumferential face of the honeycomb structure 20 for working fluid that is surrounded by the honeycomb structure 21 for exhaust gas, and so the honeycomb structure 20 for working fluid is heated from the circumference. The heat received in this way by the honeycomb structure 20 for working fluid, is used to keep the end face of the first heat/acoustic wave conversion component 1A on the first heat exchanger 2A side at a high-temperature state (a state higher than the temperature at the end face on the third heat exchanger 3A side).

As described above, the honeycomb structure 21 for exhaust gas has a function of receiving heat from the exhaust gas pipe 200 and transmitting the heat to the honeycomb structure 20 for working fluid. Therefore, the honeycomb structure 20 for working fluid is desirably made of a material having high heat resistance as well as large heat conductivity, and a ceramic material containing SiC (silicon carbide) as a main component as stated above is a most suitable material to meet this demand. Actually ceramic materials have high heat resistance in general, and among such ceramic materials, a ceramic material containing SiC (silicon carbide) as a main component is a material that is known to have relatively high heat resistance.

Note here that the honeycomb structure 21 for exhaust gas "containing SiC (silicon carbide) as a main component" means that SiC accounts for 50 mass % or more of the material of the honeycomb structure 21 for exhaust gas. At this time, the porosity of the honeycomb structure 21 for exhaust gas is preferably 0 to 10%. It is then preferable that the thickness of the partition wall 201 is 0.25 to 0.51 mm and the cell density is 15 to 62 cells/cm$^2$.

Specific examples of the ceramic material containing SiC as a main component include simple SiC as well as Si impregnated SiC, (Si+Al) impregnated SiC, metal composite SiC, recrystallized SiC, $Si_3N_4$ and SiC. Among them, Si impregnated SiC and (Si+Al) impregnated SiC are preferable. This is because Si impregnated SiC has good heat conductivity and heat resistance, and has low porosity although it is a porous body and so is formed densely, and then it can realize relatively high strength as compared with SiC without impregnated Si.

That is the description on the first heat exchanger 2A. The following describes the details of the configuration of the first heat/acoustic wave conversion component 1A of FIG. 2.

Figure 4:
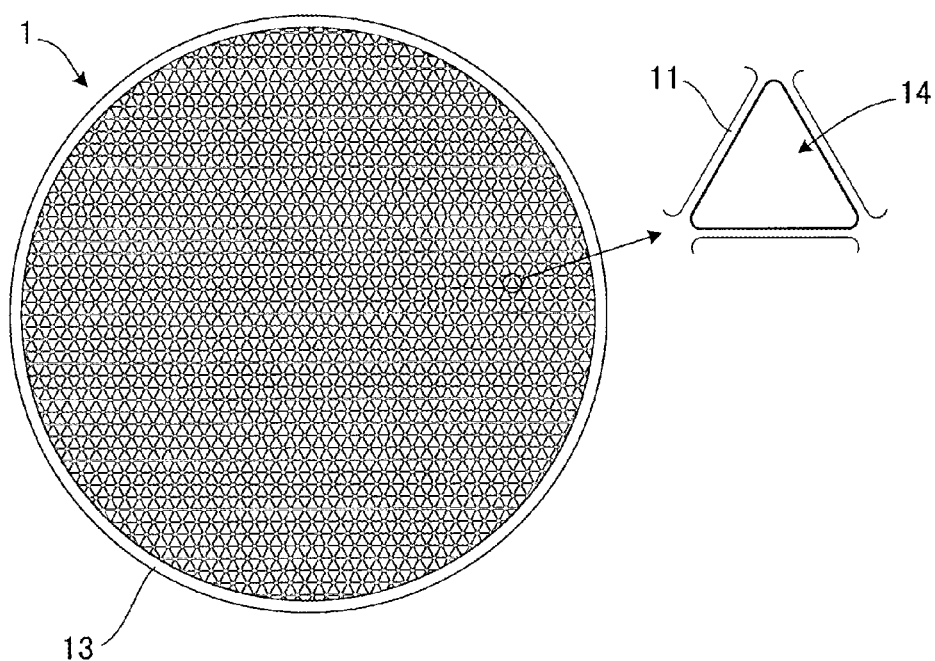
FIG. 4 is a cross-sectional view of a first heat/acoustic wave conversion component of FIG. 2 in a plane perpendicular to the cell penetrating direction of the heat/acoustic wave conversion component.

FIG. 4 is a cross-sectional view of the heat/acoustic wave conversion component 1 in a plane perpendicular to the penetrating direction of the cells 14 of the first heat/acoustic wave conversion component 1A of FIG. 2.

As shown in FIG. 4, the first heat/acoustic wave conversion component 1A includes a plurality of cells 14, each being a thin-tube like through hole, that are defined by a partition wall 11, and the partition wall 11 as a whole is then surrounded with a circumferential wall 13 (not illustrated in FIG. 2). The circumferential wall 13 may be made of the same material as that of the partition wall 11.

As described above, the hydraulic diameter HD of the cells 14 is one of the important factors to generate acoustic waves by self-induced oscillations, and the hydraulic diameter HD of the cells 14 in the first heat/acoustic wave conversion component 1A has a very small value of 0.4 mm or less. Such cells with a very small hydraulic diameter HD can realize a sufficient thermoacoustic effect from the first heat/acoustic wave conversion component 1A. Conversely if the hydraulic diameter HD is larger than 0.4 mm, a small thermoacoustic effect only can be realized, and the amount of water recovered from the water recovery system of FIG. 1, for example, is less to some extent.

Note here that for a larger thermoacoustic effect, it is advantageous to form as many as possible of the cells having a small hydraulic diameter HD as stated above. In other words, a larger open frontal area at the end faces of the first heat/acoustic wave conversion component 1A is more advantageous. The open frontal area of the first heat/acoustic wave conversion component 1A is high of 60% or more at each end face, from which a large thermoacoustic effect can be achieved. Conversely if the open frontal area is less than 60%, the number of cells contributing to the thermoacoustic effect is too small, and so a very large thermoacoustic effect cannot be achieved therefrom.

In this respect, however, if the open frontal area is too high, a hollow part of the first heat/acoustic wave conversion component 1A is too much, and so the durability and the strength of the first heat/acoustic wave conversion component 1A as a whole deteriorate. Then, the open frontal area of the first heat/acoustic wave conversion component 1A is limited to 93% or less. Actually if the open frontal area exceeds 93%, damage on the first heat/acoustic wave conversion component 1A due to impacts from acoustic waves generated or thermal distortion or warping (thermal stress) resulting from a temperature difference between both ends of the first heat/acoustic wave conversion component 1A cannot be ignored.

As a conclusion, the first heat/acoustic wave conversion component 1A has the open frontal area at the end faces of the first heat/acoustic wave conversion component 1A which is 60% or more and 93% or less, whereby adequate balance between a sufficient thermoacoustic effect and sufficient durability/strength can be achieved. The open frontal area of 80% or more and 93% or less is preferable in the open frontal area of 60% or more and 93% or less.

The open frontal area can be obtained by taking an image of a cross section perpendicular to the penetrating direction by a microscope, and determining the material-part area S1 and the gap-part area S2 from the taken image of the cross section. Then the open frontal area can be obtained as S2/(S1+S2) based on S1 and S2.

In the first heat/acoustic wave conversion component 1A, the cells 14 preferably have a cross-sectional shape that is perpendicular to the penetrating direction of the cells such that it is a polygonal shape whose corners are curved, and the corners of the shape preferably have a curvature radius of 0.02 mm or more and 0.1 mm or less. FIG. 4 shows a triangle with curved corners as an exemplary shape of the cells 14 in the enlarged view on the upper right side, where the curved corners of the triangle have the curvature radius of 0.02 mm or more and 0.1 mm or less. Such a curvature radius of 0.02 mm or more means a gently curved shape, and so the cells 14 can sufficiently resist an impact acting to crush the cells. This is based on the same reason for the shape of a hole such as a tunnel, i.e., a rounded shape that is more resistant to an external force from the surrounding than an angular shape. On the other hand, if the curved part is too large, then the partition wall 11 close to the corners of the cells is thick and the open frontal area decreases, and accordingly the thermoacoustic effect obtained will be reduced. Then, the curvature radius is set at 0.1 mm or less, whereby a high thermoacoustic effect also can be kept at the same time.

The curvature radius at the corners of the cells 14 can be measured by taking an enlarged photo of the cells 14 in a cross section perpendicular to the penetrating direction and based on the cross-sectional shapes of the cells 14.

The cells 14 may have a shape in a plane perpendicular to the penetrating direction of the cells 14 that is various polygons, such as triangles, quadrangles, pentagons and hexagons as well as ellipses (including a perfect circle shape), where triangles, quadrangles and hexagons and their combinations are preferable. As shown in the enlarged view of the cells 14 on the upper right side of the first heat/acoustic wave conversion component 1A in FIG. 4, triangular cells 14 are particularly preferable. Such triangular cells 14 are particularly preferable because, among various polygonal shapes and elliptical cell shapes, triangular cell shapes are the most suitable for the arrangement of a lot of cells while minimizing the thickness of the partition wall. Note here that, in the case of a honeycomb structure to load catalyst for exhaust purification to remove particulates from exhaust gas of automobiles, if their cells have corners at acute angles, particulates easily accumulate at the corners unfortunately. Then, such a honeycomb structure does not actually have triangular cell shapes in many cases, although it can have such a shape in principle. On the other hand, in the case of a honeycomb structure to exert a thermoacoustic effect, such a problem does not happen due to working fluid (gas such as rare gas) causing self-induced oscillations, and so triangular cell shapes (precisely speaking, triangles with curved corners), which are the most suitable to arrange a lot of cells, can be used positively.

Let that L denotes the length between both end faces of the first heat/acoustic wave conversion component 1A, the first heat/acoustic wave conversion component has a ratio HD/L of the hydraulic diameter HD as stated above to the length L that is 0.005 or more and less than 0.02. If HD/L is less than 0.005, the first heat/acoustic wave conversion component 1A is too long as compared with the hydraulic diameter HD. Then working fluid in each cell of the first heat/acoustic wave conversion component 1A will be less affected from a temperature difference between both ends of the heat/acoustic wave conversion component. In this case, heat exchange between the working fluid in each cell and the partition wall 11 is not sufficient and so a sufficient thermoacoustic effect cannot be obtained. On the other hand, if HD/L is 0.02 or more, then the first heat/acoustic wave conversion component 1A is too short as compared with the hydraulic diameter HD. In this case, heat is transmitted through the partition wall 11 from the first heat exchanger 2A side to the third heat exchanger 3A side in the first heat/acoustic wave conversion component 1A before heat exchange between the working fluid in each cell and the partition wall 11 becomes sufficient. As a result, a sufficient thermoacoustic effect still cannot be obtained. Then, the first heat/acoustic wave conversion component 1A has the ratio HD/L of 0.005 or more and less than 0.02, and so heat exchange between the working fluid in each cell and the partition wall 11 is sufficient. As a result, the first heat/acoustic wave conversion component 1A can have a sufficient thermoacoustic effect.

In the first heat/acoustic wave conversion component 1A, the materials making up the first heat/acoustic wave conversion component 1A, especially the materials making up the partition wall 11 have a ratio of thermal expansion at 20 to 800° C. that is 6 ppm/K or less preferably. One of the methods to implement such a state of a low ratio of thermal expansion includes using a honeycomb structure made of cordierite that has a low ratio of thermal expansion among ceramic materials. Herein, a "honeycomb structure made of cordierite" refers to a honeycomb structure prepared using a cordierite forming raw material that is formulated to have a chemical composition in the range of 42 to 56 mass % silica, 30 to 45 mass % alumina and 12 to 16 mass % magnesia as a ceramic raw material to manufacture the honeycomb structure, which forms cordierite after firing.

The ratio of thermal expansion can be measured, for example, by cutting out, from the first heat/acoustic wave conversion component 1A, a test piece that has a length of 10 mm or more along the penetrating direction of each cell and having an area of a cross section including the direction orthogonal to the penetrating direction that is 4 mm² or more and 100 mm² or less, and measuring the ratio of thermal expansion of this test piece in the penetrating direction using a differential thermal dilatometer using quartz as a reference comparative sample.

Such a ratio of thermal expansion at 20 to 800° C. of 6 ppm/K or less of the materials making up the partition wall 11 can suppress damage on the first heat/acoustic wave conversion component 1A when a temperature difference occurs at the both ends. A ratio of thermal expansion of 4 ppm/K or less is more preferable in the ratio of thermal expansion of 6 ppm/K or less.

That is the detailed descriptions on the configuration of the first heat/acoustic wave conversion component 1A of FIG. 2.

The following describes a method for manufacturing the water recovery device 1000 of FIG. 1, to which a specific example of the acoustic-wave generator 100A of FIG. 2 is applied.

To begin with, a method for manufacturing the acoustic-wave generator 100A is described. Firstly a method for manufacturing the first heat/acoustic wave conversion component 1A is described below.

Binder, surfactant, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. As stated above, the cordierite forming raw material is a ceramic raw material formulated to have a chemical composition in the range of 42 to 56 mass % silica, 30 to 45 mass % alumina and 12 to 16 mass % magnesia, and that forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropoxyl cellulose are preferably used together.

The content of the binder is preferably 2 to 20 mass % with reference to the forming raw material as a whole.

The content of water is preferably 7 to 45 mass % with reference to the forming raw material as a whole.

Exemplary surfactant used includes ethylene glycol, dextrin, fatty acid soap, or polyalcohol. They may be used alone or in combination of two or more types. The content of the surfactant is preferably 5 mass % or less with reference to the forming raw material as a whole.

Exemplary pore former includes starch, foamable resin, water absorbable resin or silica gel.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a honeycomb formed body including a partition wall defining a plurality of cells is prepared. For the extrusion, a die having a shape in accordance with the hydraulic diameter of each cell, the open frontal area, the shape of the first heat/acoustic wave conversion component 1A, the cell shape, and the period of the cells as stated above is preferably used. A preferable material of the die is cemented carbide having wear resistance. Values of the hydraulic diameter of each cell, the open frontal area, or the like of the honeycomb formed body are determined preferably while considering contraction generated during drying and firing described later as well.

Herein the first heat/acoustic wave conversion component 1A having a very small hydraulic diameter of each cell and having a large open frontal area (having large cell density) as stated above to exert a large thermoacoustic effect cannot be manufactured by simply using an extrusion method as it is (i.e., by simply executing a similar manufacturing method using a different die to form high-density pores) that is used for a conventional honeycomb structure to load catalyst for exhaust purification, which is free from such constraints, due to the following two problems.

The first problem is that, during extrusion, kneaded material extruded at a high temperature adheres to the holes in a forming die, which easily generates clogging. This problem is mentioned also by Patent Document, JP-A-2012-237295 as stated above.

The second problem is that a die used for a honeycomb structure as in the first heat/acoustic wave conversion component 1A as stated above having a very small hydraulic diameter of each cell and having a large open frontal area (having large cell density) inevitably includes a very thin and minute part (typically a part of about 0.3 mm in thickness). Then, such a minute part often is damaged (e.g., is torn) by viscous friction during kneaded material extrusion.

Then, the manufacturing method of the first heat/acoustic wave conversion component 1A as stated above has the following configuration to solve these two problems.

For the first problem, prior to the extrusion using a die (hereinafter called a real die) corresponding to the first heat/acoustic wave conversion component 1A having the hydraulic diameter of each cell that is 0.4 mm or less and the open frontal area that is 60% or more and 93% or less, i.e., having a very small hydraulic diameter of each cell and having a large open frontal area (having large cell density), a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb formed body, and means a slit width of the die. Each slit is a hole to discharge the kneaded material and is to determine the shape of each partition wall part at the honeycomb structure to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed.

The second problem is solved by reducing viscosity of the kneaded material used for extrusion greatly as compared with the viscosity of a kneaded material used for a conventional honeycomb structure to load catalyst for exhaust purification so as to reduce the viscous friction while keeping the range of a shape-holding property (i.e. the shape of the formed body is not distorted) of the formed body of the first heat/acoustic wave conversion component 1A during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the first heat/acoustic wave conversion component 1A, while the ratio of water in the kneaded material is 25 to 35 parts by mass with reference to 100 parts by mass of the kneaded material solid component that is used to manufacture a conventional honeycomb structure to load catalyst for exhaust purification. When the ratio of water in the kneaded material increases, then viscosity of the kneaded material decreases and adequate fluctuations occur in the shape of the formed body of the first heat/acoustic wave conversion component 1A. This leads to another advantageous effect that self-induced oscillations of acoustic waves likely occur.

The following continues the description on the following processing for the honeycomb formed body that is obtained by the extrusion.

The thus obtained honeycomb formed body is dried before firing. A method for drying is not limited especially, and exemplary methods include an electromagnetic wave heating method such as microwave heat-drying and high-frequency induction heating drying and an external heating method such as hot air drying and superheated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell penetrating direction is not a desired length, it is preferable to cut both of the end faces (end parts) to have the desired length. Although a method for cutting is not limited especially, exemplary method includes a method using a circular saw cutter.

Next, this honeycomb formed body is fired. It is preferable to perform calcination before firing to remove the binder and the like. The calcination is preferably performed at 400 to 500° C. for 0.5 to 20 hours in the ambient atmosphere. A method for calcination or firing (main firing) is not limited especially, and they may be performed using an electric furnace, a gas furnace, or the like. As the firing (main firing) conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Finally, if it is required to be a desired cross-sectional shape (e.g., a circle as in FIG. 4) of the first heat/acoustic wave conversion component 1A, the circumferential part of the honeycomb formed body after firing is cut as needed to correct the shape. Then, an outer coating material is applied to the circumferential face of the honeycomb formed body after cutting, followed by drying, whereby a circumferential wall 13 is formed. Herein, the outer coating material used may be slurry, for example, which is prepared by adding an additive such as organic binder, foamable resin or dispersing agent to a raw material including inorganic particles and colloidal oxide, to which water is added, followed by kneading. Herein exemplary inorganic particles include particles made of a ceramic material containing one or two or more in combination of cordierite, alumina, aluminum titanate, silicon carbide, silicon nitride, mullite, zirconia, zirconium phosphate and titania, or particles of Fe—Cr—Al-based metal, nickel-based metal and silicon (metal silicon)-silicon carbide based composite materials. Exemplary colloidal oxide includes silica sol and alumina sol. A method for applying the outer coating material is not limited especially, and for example, the coating material may be coated with a rubber spatula, for example, while rotating the honeycomb formed body after cutting on a wheel.

Through these steps, the first heat/acoustic wave conversion component 1A is finally completed.

Next the following describes a method for manufacturing the first heat exchanger 2A of FIG. 2.

The honeycomb structure 21 for exhaust gas in the first heat exchanger 2A of FIG. 2 can be manufactured by a manufacturing method similar to the method for manufacturing the first heat/acoustic wave conversion component 1A of FIG. 4 as stated above, other than that mixture of carbon powder (e.g., graphite powder) with SiC powder is used as the ceramic raw material, that a die suitable for a honeycomb formed body having a relatively large hydraulic diameter HD of cells is used as the die for extrusion, and that, in order to achieve the shape of a hollow and round pillar-shape (in other words, a cylindrical shape having a thickness), cutting is performed so as to have this shape after firing or a die leading to this shape is used during forming processing in the method for manufacturing the monolithic first heat/acoustic wave conversion component 1A of FIG. 4 as stated above.

To manufacture this honeycomb structure 21 for exhaust gas, for example, to manufacture the honeycomb structure 20 for working fluid including a Si impregnated SiC composite material as a main component, it is preferable that a kneaded material prepared by mixing SiC powder with carbon powder and kneading for adjustment is formed to be a honeycomb formed body, then drying and firing processing are performed thereto, and then molten silicon (Si) is impregnated in this honeycomb formed body. Such processing can form a configuration where coagulation of metal Si (metal silicon) surrounds the surface of SiC particles after the firing processing, and SiC particles are mutually bonded via metal Si. Such a configuration can achieve high heat durability and heat conductivity in spite of the dense configuration with small porosity.

In addition to the molten silicon (Si), other metals such as Al, Ni, Cu, Ag, Be, Mg, and Ti may be used for impregnation. In this case, after firing, coagulation of metal Si (metal silicon) and other metals used for impregnation surrounds the surface of SiC particles, and SiC particles are mutually bonded via metal Si and other metals used for impregnation in the formed configuration. Such a configuration also can achieve high heat durability and heat conductivity in spite of the dense configuration with small porosity.

The honeycomb structure 20 for working fluid in the first heat exchanger 2A of FIG. 2 can be manufactured by a conventional manufacturing method that is used to manufacture a metal honeycomb structure, such as method for forming a honeycomb structure using a mold or a method for forming a honeycomb structure by cutting. The metal outer tube 23 and the metalized layer 22 also can be manufactured by a conventional method.

In this way, the first heat exchanger 2A is finally completed.

The third heat exchanger 3A of FIG. 2 can be manufactured using a conventionally known method for manufacturing a heat exchanger as it is.

That is the description on the method for manufacturing the acoustic-wave generator 100A.

The cold-heat generator 100B can have a configuration similar to the acoustic-wave generator 100A as stated above, and so it can be manufactured similarly to the acoustic-wave generator 100A as stated above.

The transmission pipe 100C can be manufactured by forming a material with high durability into an annular shape (note here that an annular shape with a part thereof missing so as to enable connection with the acoustic-wave generator 100A and the cold-heat generator 100B). The material with high durability is not limited especially, and examples thereof include metal such as iron, a hard plastic material, hardened glass, as well as a ceramic material (e.g., those listed for the material of the first heat/acoustic wave conversion component 1A as stated above).

That is the description on the method for manufacturing the water generation unit 100.

The exhaust gas pipe 200 can be manufactured by forming a material with high heat resistance to be in a form connectable to the water generation unit 100 and the water container 300 as shown in FIG. 1. The material with high heat resistance is not limited especially, and specific examples thereof include high heat-resistance stainless steel, metal such as iron or copper, as well as a ceramic material (e.g., those listed for the material of the first heat/acoustic wave conversion component 1A of FIG. 4 or for the honeycomb structure 20 for working fluid as stated above).

For the water container 300, a container of a size in accordance with the size of the water recovery device 1000 or the amount of water to be recovered can be used. This container may be manufactured using an appropriate material, such as metal, a plastic material or ceramic, or a commercially available container may be selected for use as needed.

That is the description on the method for manufacturing the water recovery device 1000.

Next, the following describes another water recovery system, to which the water recovery device 1000 of FIG. 1 is applied.

Figure 5:
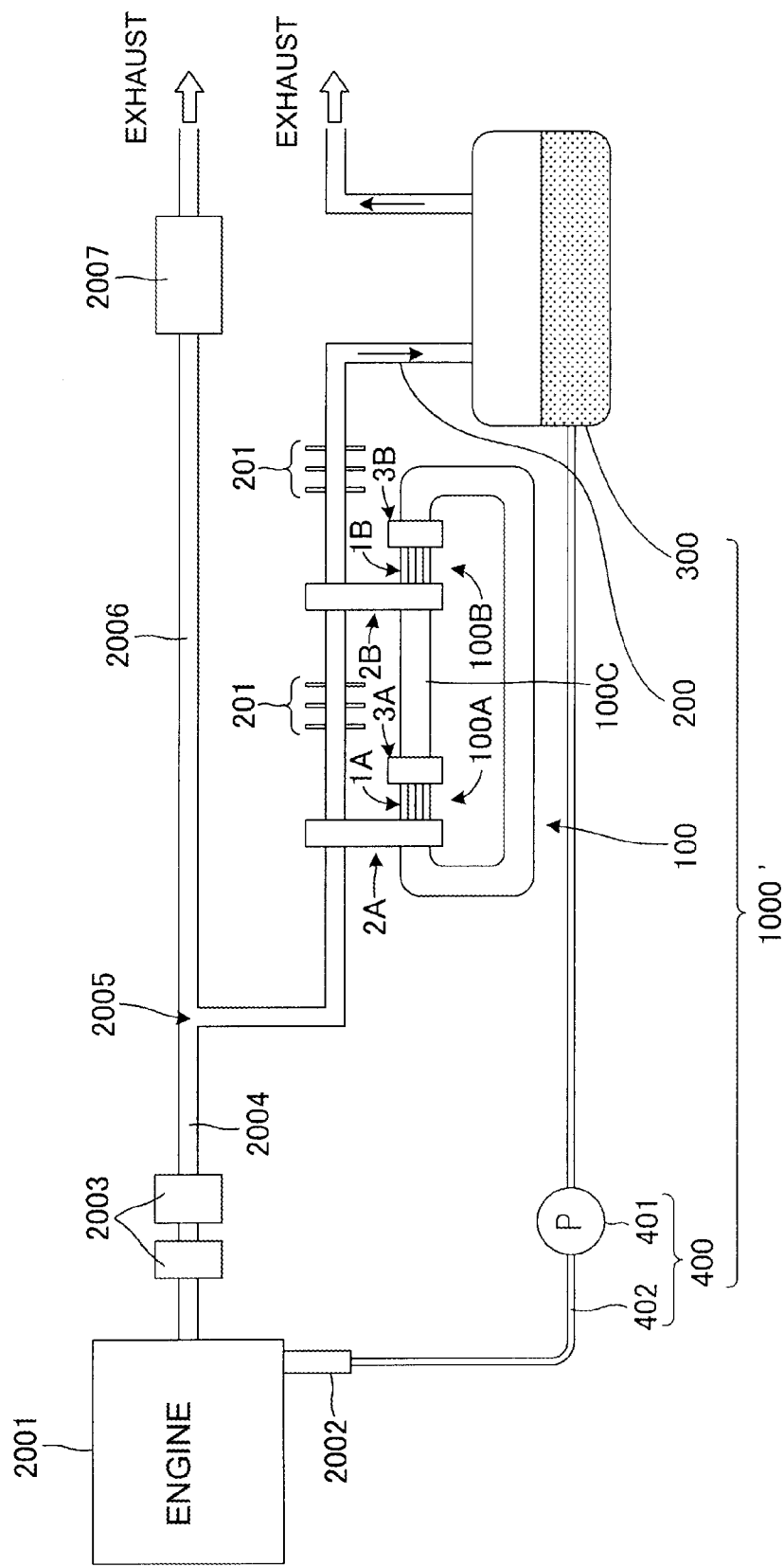
FIG. 5 is a schematic conceptual view showing another water recovery system to which the water recovery device 1000 of FIG. 1 is applied.

FIG. 5 is a schematic conceptual view showing another water recovery system to which the water recovery device 1000 of FIG. 1 is applied.

In FIG. 5, the same reference numerals are used for elements corresponding to the elements of the water recovery system of FIG. 1, and their duplicated descriptions are omitted. The water recovery system of FIG. 5 includes an engine 2001 that generates power through explosion power (expansion power) which is obtained by mixing evaporated gasoline and air to highly compress the mixture gas, and by igniting this compressed gas. Exhaust gas generated during the generation of this power is emitted through a first exhaust gas pipe 2004. Herein, at the time of power generation, hydrogen (hydrogen atoms) in the evaporated gasoline and oxygen in the air are combined to generate water, and so the water is included in the exhaust gas in the form of water vapor.

Exhaust gas undergoes purification processing by two three-way catalytic converters 2003 provided on the first exhaust gas pipe 2004, and is separated at a branch 2005 to be along two different exhaust paths for emission. One of the exhaust paths is an exhaust path defined by a second exhaust gas pipe 2006, where much of the exhaust gas (50 to 99 volume % as described later) passes through this second exhaust gas pipe 2006, which is then emitted externally through a muffler 2007 provided on the second exhaust gas pipe 2006.

Herein, one end of the exhaust gas pipe 200 of the water recovery device 1000 described in FIG. 1 is connected to the branch 2005, and this exhaust gas pipe 200 defines another exhaust path different from the second exhaust gas pipe 2006 as stated above. Hereinafter, in FIG. 5, in order to distinguish the exhaust gas pipe 200 from the first exhaust gas pipe 2004 and the second exhaust gas pipe 2006, this exhaust gas pipe 200 may be called a bypass pipe 200.

That is, in the water recovery system of FIG. 5, a part of exhaust gas emitted from the engine 2001 is bypassed, and water is recovered from the bypassed exhaust gas. Such recovery of water is performed using the water generation unit 100, the exhaust gas pipe 200 and the water container 300 described in FIG. 1, and so their duplicated descriptions are omitted. In the water recovery system of FIG. 5 as well, the specific example described in FIG. 2 can be used for the water generation unit 100.

In this water recovery system of FIG. 5, an injector 2002 is provided at the engine 2001 so as to inject water to mixture gas of the evaporated gasoline and air.

It is known in general that, when mixture gas of evaporated gasoline and air is highly compressed, abnormal combustion likely occurs, in which impurities in the gasoline engine, such as carbon, trigger ignition prior to the ignition by an ignition device. In the water recovery system of FIG. 5, water is injected by the injector 2002 to add the water to mixture gas, whereby drying in the gasoline engine is suppressed and abnormal combustion can be controlled. This injection for addition of water can be called a sort of humidification processing using water.

In the water recovery system of FIG. 5, a water recovery device 1000' further includes, in addition to the water generation unit 100, the exhaust gas pipe 200 and the water container 300 as stated above, a water supply mechanism 400 to supply water to the injector 2002. The water supply mechanism 400 has a pump 401 and a water supply pipe 402, and is able to pump up water in the water container 300 by the pump 401 and send the pumped water to the injector 2002 via the water supply pipe 402. In this way, the water recovery device 1000' can effectively use water recovered from exhaust gas as water to suppress abnormal combustion.

Herein, exhaust gas from a gasoline engine typically includes a lot of water, and if the entire exhaust gas is a target from which water is to be recovered, the water recovery device will be large in size because it has to store a lot of water. The water recovery system of FIG. 5 recovers water in the bypassed exhaust gas only, whereby its water recover device can have an appropriate size, instead of such a large size. Specifically it is desirable that the bypass pipe 200 define an exhaust path for 1 to 50 volume % of exhaust gas of the entire exhaust gas. If it is less than 1 volume %, the amount of recovered water is too small, and if it exceeds 50 volume %, the amount of recovered water is too much, which means difficulty to avoid a large-sized water recovery device 1000.

The water recovery device 1000' of FIG. 5 can be manufactured by combining the water supply mechanism 400 including the pump 401 and the water supply pipe 402 with the method for manufacturing the water recovery device 1000 of FIG. 1 as stated above. Herein, for the water supply mechanism 400, a conventionally known water circulation system, e.g., a commercially available water circulation device can be used as it is.

In the water recovery device 1000 of FIG. 1 and the water recovery device 1000' of FIG. 5 as described above, the third heat exchanger 3A and the fourth heat exchanger 3B of the water generation unit 100, which do not come into contact with the exhaust gas pipe 200, perform heat exchange with air. The present invention may have another form in which heat exchange is performed with circulating water at ambient temperature. In this case, although there are drawbacks, compared with heat exchange with air, that power and energy for water circulation are required and size of the water recovery device is increased, the temperature at an end face of each heat/acoustic wave conversion component close to each of the above two heat exchangers is more stable and can be kept at a constant temperature around an ambient temperature.

The water recovery device 1000 of FIG. 1 and the water recovery device 1000' of FIG. 5 as described above include a loop-shaped transmission pipe 100C. The transmission pipe of the present invention, however, may have another form as long as it meets the minimum requirement that acoustic waves generated at the acoustic-wave generator 100A are transmitted to the cold-heat generator 100B. For instance, various forms that are well known in the field of thermoacoustic effect can be used, other than a loop-like form. The following describes variations of the transmission pipe 100C to meet the requirement.

FIG. 6 to FIG. 9 show variations of the transmission pipe 100C in the water generation unit 100 of the water recovery device 1000 of FIG. 1 or the water recovery device 1000' of FIG. 5.

Figure 6:
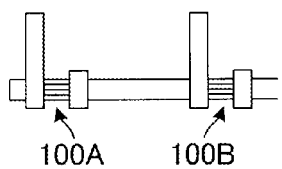
FIG. 6 shows a variation of the transmission pipe in the water generation unit of the water recovery device of FIG. 1 or the water recovery device of FIG. 5.
Figure 7:
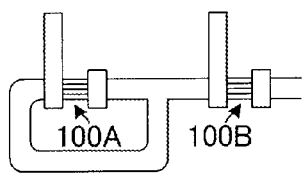
FIG. 7 shows a variation of the transmission pipe in the water generation unit of the water recovery device of FIG. 1 or the water recovery device of FIG. 5.
Figure 8:
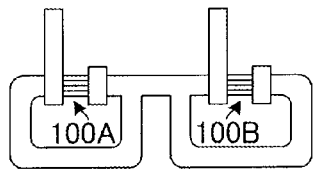
FIG. 8 shows a variation of the transmission pipe in the water generation unit of the water recovery device of FIG. 1 or the water recovery device of FIG. 5.
Figure 9:
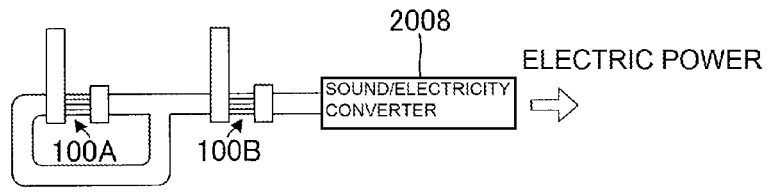
FIG. 9 shows a variation of the transmission pipe in the water generation unit of the water recovery device of FIG. 1 or the water recovery device of FIG. 5.

FIG. 6 shows a generally straight-line shaped transmission pipe, FIG. 7 shows a transmission pipe that has a loop shape at around the acoustic-wave generator 100A only, and a part around the cold-heat generator 100B has a straight-line shape. In these forms, the transmission pipe is open on the right of the cold-heat generator 100B in the drawings, and air (atmosphere) is used as the working fluid. On the contrary, FIG. 8 shows a transmission pipe including separate loop shapes around the acoustic-wave generator 100A and the cold-heat generator 100B, and in this form no opening is present, and air does not flow into or out from the transmission pipe. Therefore, a specific type of air, such as less reactive rare gas, can be used as the working fluid. FIG. 9 shows an example, in which a sound/electricity converter 200S is connected to the open end of the transmission pipe in the form of FIG. 7. In this case, energy of acoustic waves passing through the cold-heat generator 100B is converted into electricity at the sound/electricity converter 200S, and so the energy can be effectively used in the form of electricity. As the sound/electricity converter 200S, a microphone can be used, for example. Instead of converting acoustic-wave energy into electricity, the energy can be used as a certain power source (the acoustic-wave energy is allowed to collide with a fan so as to generate a rotating force of the fan, for example).

EXAMPLES

The following describes specific examples to demonstrate the advantageous effects of the present invention. In the following examples, the specific example of FIG. 2 was used as the water recovery device 1000' in the water recovery system of FIG. 5.

As the engine, an engine gasoline having displacement of 2 L was used. As the working fluid, helium gas of 1 MPa in pressure was used, and as the transmission pipe of the working fluid, a transmission pipe having a diameter of 40 mm was used. For each of the first heat/acoustic wave conversion component and the second heat/acoustic wave conversion component (they were the same), a cordierite honeycomb structure was used, having a round pillar-shape of 40 mm in diameter and 60 mm in length, where each cell had a hydraulic diameter of 0.3 mm and an open frontal area at end faces was 74%.

These heat/acoustic wave conversion components were manufactured as follows.

Cordierite forming raw material was used as the ceramic raw material, and 1 part by mass of pore former, 35 parts by mass of dispersing medium, 6 parts by mass of organic binder, and 0.5 parts by mass of dispersing agent were added to 100 parts by mass of the cordierite raw material, followed by mixing and kneading to prepare a kneaded material. The cordierite raw material used included 38.9 parts by mass of talc of 3 μm in average particle diameter, 40.7 parts by mass of kaolin of 1 μm in average particle diameter, 5.9 parts by mass of alumina of 0.3 μm in average particle diameter, and 11.5 parts by mass of boehmite of 0.5 μm in average particle diameter. Herein the average particle diameter refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die, so that a honeycomb formed body including triangular cells and having a circular overall shape was prepared. During this extrusion, prior to the extrusion using a regular die corresponding to the heat/acoustic wave conversion component of Example 1, the kneaded material was extruded using a dummy die of about 0.07 mm in rib thickness as stated above. Then, using the kneaded material after the extrusion using this dummy die, extrusion using the real die was executed. At this time, the ratio of water in the kneaded material used for the extrusion using the real die was strictly controlled in the kneaded material component so that it was 41 parts by mass (error was within ±1 part by mass) with reference to 100 parts by mass of the kneaded material solid component.

Then, this honeycomb formed body was dried by a microwave dryer, and further was dried completely by a hot-air drier, and then both end faces of the honeycomb formed body were cut so as to adjust the length of the honeycomb formed body in the cell penetrating direction. Such a honeycomb formed body was dried by a hot-air drier, and then was fired at 1,445° C. for 5 hours.

Finally, the circumferential part of the honeycomb formed body after the firing step was cut as needed to correct the shape to be a round pillar-shape. Then, an outer coating material was applied to the circumferential face of the honeycomb formed body after cutting, followed by drying, whereby a circumferential wall was formed. Herein, the outer coating material was slurry prepared by adding organic binder, foamable resin and dispersing agent to a raw material including cordierite particles and silica sol, to which water was added and kneaded. As a method for applying the outer coating material, the coating material was coated with a rubber spatula, for example, while rotating the honeycomb formed body after cutting on a wheel.

Through these steps, a heat/acoustic wave conversion component was completed. For the completed heat/acoustic wave conversion component, the hydraulic diameter HD of the cells in a plane perpendicular (perpendicular plane) to the cell penetrating direction and the open frontal area at the end faces of the heat/acoustic wave conversion component were measured. As stated above, the hydraulic diameter HD of the cells was 0.3 mm, and the open frontal area at the end faces of the heat/acoustic wave conversion component was 74%.

The hydraulic diameter HD of the cells was obtained as follows. That is, an enlarged photo of the cross section of the heat/acoustic wave conversion component in the perpendicular plane was taken, and ten cells were selected at random in this enlarged photo of the cross section. Then, the hydraulic diameter of each was calculated by the expression to define the hydraulic diameter: HD=4×S/C, where S denotes the cross-sectional area of the cell and C denotes the perimeter of this section, and then average of them was calculated as the hydraulic diameter.

The open frontal area was obtained by taking an image of the cross section in the perpendicular plane by a microscope, and finding the material-part area S1 and the gap-part area S2 from the image taken of the cross section. Then the open frontal area was obtained as S2/(S1+S2) based on S1 and S2. Note that the open frontal area at the cross section as a whole is considered to be equal to the open frontal area at the end face, and then the open frontal area at the cross section as a whole is considered as the open frontal area at the end face.

That is the description on the manufacturing of each heat/acoustic wave conversion component in this example. The elements other than the heat/acoustic wave conversion component, e.g., the heat exchangers and the transmission pipe were prepared appropriately so as to suit for the size or the shape of the heat/acoustic wave conversion component as stated above.

Under the configuration conditions as stated above, the device was operated under the control condition that the number of revolutions of the engine was set at 2,000 (revolutions per minute) and the temperature at around the exhaust gas outlet of the two three-way catalytic converters was 600° C.

At this time, the amount of water injected by the injector, i.e., the amount of water recovered by the water recovery device was 0.8 [Kg/hour].

In this way, a sufficient amount of water was recovered per unit time, meaning that the water recovery device based on the thermoacoustic effect can recover water from exhaust gas of an engine effectively.

Next, the following describes a high thermoacoustic effect obtained from a honeycomb structure including each cell having the hydraulic diameter of 0.4 mm or less and the open frontal area of 60% or more and 93% or less, i.e., having a very small hydraulic diameter and a large open frontal area (having large cell density), by way of the experiment using the heat/acoustic wave conversion components of the following honeycomb structures <1> to <4>.

(Honeycomb Structure <1>)

Honeycomb structure <1> was a cordierite honeycomb structure that was used as a heat/acoustic wave conversion component in the above-stated example, and as stated above, this honeycomb structure <1> had the hydraulic diameter HD of cells that was 0.3 mm, and the open frontal area at the end faces of the honeycomb structure <1> that was 74%.

The following experiment was conducted using this honeycomb structure <1>.

The cold-heat generator 100B of the water generation unit 100 in FIG. 1 was removed, and a microphone was connected to one end of the transmission pipe 100C on the acoustic-wave generator 100A side that was connected to the cold-heat generator 100B. In such a system, Honeycomb structure <1> was assembled as the heat/acoustic wave conversion component 1 in the acoustic-wave generator 100A. Then exhaust gas of an automobile at about 500° C. was allowed to flow into there for 10 minutes, and the temperature of the exhaust gas flowing out whose temperature fell to some extent was measured. Based on a temperature change at this time, the amount of heat flowing into this system was calculated. Due to the flowing-in of this exhaust gas, the temperature at the end face of Honeycomb structure <1> on the first heat exchanger side was kept at 500° C. substantially. At this time, the temperature at the end face on the third heat exchanger side on the opposite side was kept at 60° C. substantially due to heat exchange with air. Then, measurement was performed using the microphone as stated above as to what degree of electric power was generated from acoustic waves by a thermoacoustic effect due to the temperature difference at this Honeycomb structure <1>. Then, a measurement value of the electric power amount was divided by the energy conversion efficiency (efficiency to convert acoustic-wave energy into electric power) of the microphone known beforehand, whereby an estimated value of acoustic-wave energy was obtained. Then, based on this estimated value of acoustic wave energy and the amount of heat flowing into the power generation system as stated above, energy conversion efficiency from heat to acoustic-wave energy was obtained. In this experiment, working fluid was helium gas at 10 atm.

(Honeycomb Structure <2> and Honeycomb Structure <3>)

Honeycomb structure <2> and Honeycomb structure <3> were manufactured by the same manufacturing method as that of Honeycomb structure <1> other than that a different die was used for extrusion, whereby these honeycomb structures were different from Honeycomb structure <1> only in the value of hydraulic diameter HD of the cells among the two types of parameters as stated above.

Then, a similar experiment to that for Honeycomb structure <1> was conducted for these Honeycomb structure <2> and Honeycomb structure <3>.

(Honeycomb Structures <4> to <7>)

Honeycomb structures <4> to <7> were manufactured by the same manufacturing method as that of Honeycomb structure <1> other than that a different die was used for extrusion, whereby these honeycomb structures were different from Honeycomb structure <1> only in the value of open frontal area at the end faces (the same as the open frontal area in the plane perpendicular to the cell penetrating direction).

Then, a similar experiment to that for Example 1 was conducted for these Honeycomb structures <4> to <7>.

The following Table 1 shows the experimental results on Honeycomb structures <1> to <7> as described above, together with the values of parameters.

TABLE 1

| | Cell hydraulic diameter HD (mm) | Open frontal area at end face (%) | Energy conversion efficiency (%) |
|---|---|---|---|
| Honeycomb structure <1> | 0.30 | 74 | 18.3 |
| Honeycomb structure <2> | 0.40 | 74 | 13.8 |
| Honeycomb structure <3> | 0.45 | 74 | 10.0 |
| Honeycomb structure <4> | 0.30 | 55 | 8.8 |
| Honeycomb structure <5> | 0.30 | 60 | 17.6 |
| Honeycomb structure <6> | 0.30 | 93 | 20.0 |
| Honeycomb structure <7> | 0.30 | 95 | — |

In Table 1, as is found from a comparison between Honeycomb structures <1> to <3> having mutually different hydraulic diameters HD of the cells, Honeycomb structures <1> and <2> had a sufficiently high energy conversion efficiency as compared with Honeycomb structure <3>. This shows that the hydraulic diameter HD of cells of 0.4 mm or less is required to exert a large thermoacoustic effect.

In Table 1, as is found from a comparison between Honeycomb structures <4> to <6> having mutually different open frontal areas at the end faces (open frontal area at the perpendicular plane as stated above), Honeycomb structures <5> and <6> had a sufficiently high energy conversion efficiency as compared with Honeycomb structure <4>. Herein, Honeycomb structure <7> was broken during the experiment, and so the experiment was stopped, so that the final result was not obtained for the energy conversion efficiency. Presumably this is because the component lacked the strength and durability due to too large open frontal area. Considering the results of Honeycomb structures <4> to <7> as stated above, the open frontal area at the end face of a heat/acoustic wave conversion component that is 60% or more and 93% or less is required to have a large thermoacoustic effect achieved and to avoid damage.

The present invention is useful to make use of water vapor included in exhaust gas of a combustion device.

DESCRIPTION OF REFERENCE NUMERALS

1A: first heat/acoustic wave conversion component
1B: second heat/acoustic wave conversion component
11: partition wall
12: interference member
13: circumferential wall
14: cell
2A: first heat exchanger
2B: second heat exchanger
20: honeycomb structure for working fluid
201: partition wall
202: cell
21: honeycomb structure for exhaust gas
22: metalized layer
23: metal outer tube
3A: third heat exchanger
3B: fourth heat exchanger
30: mesh lamination body
31: fin
32: metal member
100: water generation unit
100A: acoustic-wave generator
100B: cold-heat generator
100C: transmission pipe
200: exhaust gas pipe
200a: heat dissipation member
300: water container
400: water supply mechanism
401: pump
402: water supply pipe
1000, 1000': water recovery device
2000: combustion device
2001: engine
2002: injector
2003: three-way catalytic converter
2004: first exhaust gas pipe
2005: branch
2006: second exhaust gas pipe
2007: muffler
2008: sound/electricity converter

What is claimed is:

1. A water recovery device to recover water from exhaust gas including water vapor, comprising:
an exhaust gas pipe that is connected to a combustion device which combusts fuel to emit exhaust gas including water vapor, and that defines an exhaust path of exhaust gas emitted from the combustion device;
a water generation unit that generates water by cooling exhaust gas in the exhaust gas pipe to condense water vapor in the exhaust gas; and
a water container that is disposed on the exhaust path and stores water generated by the water generation unit, wherein
the water generation unit includes:
an acoustic-wave generator that generates acoustic waves by absorbing heat from the exhaust gas pipe and giving the heat to working fluid, which transmits acoustic waves by oscillating, to cause the working fluid to oscillate;
a transmission pipe that is internally filled with the working fluid and transmits acoustic waves generated by the acoustic-wave generator via oscillations of the working fluid; and
a cold-heat generator that generates cold heat to supply the cold heat to the exhaust gas pipe by receiving acoustic waves transmitted through the transmission pipe and giving heat to the acoustic waves.

2. The water recovery device according to claim 1, wherein the acoustic-wave generator includes:
a first heat/acoustic wave conversion component that has a wall part defining a through hole which penetrates through two ends of the first heat/acoustic wave conversion component and which is internally filled with the working fluid, the first heat/acoustic wave conversion component mutually converting heat exchanged between the wall part and the working fluid and acoustic-wave energy resulting from oscillations of the working fluid; and
a first heat exchanger that comes into contact with the exhaust gas pipe, and that is disposed close to one end face of the two end faces of the first heat/acoustic wave conversion component, the first heat exchanger transmitting heat from the exhaust gas pipe to the one end face so as to keep temperature at the one end face relatively higher than temperature at the other end face,
wherein the transmission pipe has one end thereof directly or indirectly connected to the other end face of the first heat/acoustic wave conversion component, and transmits acoustic waves coming out from the other end face toward the other end of the transmission pipe, and
wherein the cold-heat generator includes:
a second heat/acoustic wave conversion component that has a wall part defining a through hole which penetrates through two ends of the second heat/acoustic wave conversion component, which is internally filled with the working fluid, and through which acoustic waves transmitted through the transmission pipe travel, the second heat/acoustic wave conversion component mutually converting heat exchanged between the wall part and the working fluid and acoustic-wave energy from oscillations of the working fluid; and
a second heat exchanger that comes into contact with the exhaust gas pipe, that is disposed close to an end face located upstream in a traveling direction of acoustic waves in the through hole, of the two end faces of the second heat/acoustic wave conversion component, and that is connected to the other end of the transmission pipe, the second heat exchanger giving heat to acoustic waves transmitted through the transmission pipe so as to keep temperature at the end face located upstream in the traveling direction relatively lower than temperature at an end face located downstream in the traveling direction, of the two end faces of the second heat/acoustic wave conversion component.

3. The water recovery device according to claim 2, wherein
the acoustic-wave generator further includes a third heat exchanger that is disposed close to the other end face of the two end faces of the first heat/acoustic wave conversion component and that exchanges heat with surrounding air so as to keep temperature at the other end face substantially at air temperature, and
the cold-heat generator further includes a fourth heat exchanger that is disposed close to the end face located downstream in the traveling direction of the two end faces of the second heat/acoustic wave conversion component and that exchanges heat with surrounding air so as to keep temperature at the end face located downstream in the traveling direction substantially at air temperature.

4. The water recovery device according to claim 2, wherein
each of the first heat/acoustic wave conversion component and the second heat/acoustic wave conversion component is a honeycomb structure having a partition wall as the wall part that defines a plurality of cells extending between the two end faces,
hydraulic diameter HD of the honeycomb structure is 0.4 mm or less, where the hydraulic diameter HD is defined as HD=4×S/C, where S denotes an area of a cross section of each cell perpendicular to the cell penetrating direction and C denotes a perimeter of the cross section, and
the honeycomb structure has an open frontal area at each end face of 60% or more and 93% or less.

5. The water recovery device according to claim 3, wherein
each of the first heat/acoustic wave conversion component and the second heat/acoustic wave conversion component is a honeycomb structure having a partition wall as the wall part that defines a plurality of cells extending between the two end faces,
hydraulic diameter HD of the honeycomb structure is 0.4 mm or less, where the hydraulic diameter HD is defined as HD=4×S/C, where S denotes an area of a cross section of each cell perpendicular to the cell penetrating direction and C denotes a perimeter of the cross section, and
the honeycomb structure has an open frontal area at each end face of 60% or more and 93% or less.

6. The water recovery device according to claim 4, wherein at least one of the first heat/acoustic wave conversion component and the second heat/acoustic wave conversion component is a honeycomb structure made of cordierite.

7. The water recovery device according to claim 5, wherein at least one of the first heat/acoustic wave conversion component and the second heat/acoustic wave conversion component is a honeycomb structure made of cordierite.

8. The water recovery device according to claim 1, wherein the combustion device is an engine that generates power by evaporating fuel and combusting the evaporated fuel, and has a water addition mechanism which adds water to the evaporated fuel by injecting water, and
the water recovery device further includes a water supply mechanism that supplies water stored in the water container to the water addition mechanism.

9. The water recovery device according to claim 2, wherein the combustion device is an engine that generates power by evaporating fuel and combusting the evaporated fuel, and has a water addition mechanism which adds water to the evaporated fuel by injecting water, and
the water recovery device further includes a water supply mechanism that supplies water stored in the water container to the water addition mechanism.

10. The water recovery device according to claim 3, wherein the combustion device is an engine that generates power by evaporating fuel and combusting the evaporated fuel, and has a water addition mechanism which adds water to the evaporated fuel by injecting water, and
the water recovery device further includes a water supply mechanism that supplies water stored in the water container to the water addition mechanism.

11. The water recovery device according to claim 4, wherein the combustion device is an engine that generates power by evaporating fuel and combusting the evaporated fuel, and has a water addition mechanism which adds water to the evaporated fuel by injecting water, and
the water recovery device further includes a water supply mechanism that supplies water stored in the water container to the water addition mechanism.

12. The water recovery device according to claim 5, wherein the combustion device is an engine that generates power by evaporating fuel and combusting the evaporated fuel, and has a water addition mechanism which adds water to the evaporated fuel by injecting water, and
the water recovery device further includes a water supply mechanism that supplies water stored in the water container to the water addition mechanism.

13. The water recovery device according to claim 8, wherein the exhaust gas pipe is a bypass exhaust pipe that defines an exhaust path for 1 to 50 volume % of exhaust gas of the entire exhaust gas emitted from the combustion device.

14. The water recovery device according to claim 9, wherein the exhaust gas pipe is a bypass exhaust pipe that defines an exhaust path for 1 to 50 volume % of exhaust gas of the entire exhaust gas emitted from the combustion device.

15. The water recovery device according to claim 10, wherein the exhaust gas pipe is a bypass exhaust pipe that defines an exhaust path for 1 to 50 volume % of exhaust gas of the entire exhaust gas emitted from the combustion device.

16. The water recovery device according to claim 11, wherein the exhaust gas pipe is a bypass exhaust pipe that defines an exhaust path for 1 to 50 volume % of exhaust gas of the entire exhaust gas emitted from the combustion device.

17. The water recovery device according to claim 12, wherein the exhaust gas pipe is a bypass exhaust pipe that defines an exhaust path for 1 to 50 volume % of exhaust gas of the entire exhaust gas emitted from the combustion device.

18. The water recovery device according to claim 1, further comprising a heat dissipation member that is disposed on the exhaust gas pipe, and protrudes toward an outside of the exhaust gas pipe to let heat of the exhaust gas pipe out of the exhaust gas pipe.

* * * * *